United States Patent
Kitchaev et al.

(10) Patent No.: US 11,959,041 B2
(45) Date of Patent: Apr. 16, 2024

(54) TRIBOLOGICAL SYSTEM

(71) Applicant: Robert Bosch GmbH, Stuttgart (DE)

(72) Inventors: Daniil A Kitchaev, Brookline, MA (US); Mordechai Kornbluth, Brighton, MA (US); Martin-Christoph Kruse, Stuttgart (DE); Charles Tuffile, Swansea, MA (US)

(73) Assignee: Robert Bosch GmbH, Stuttgart (DE)

( * ) Notice: Subject to any disclaimer, the term of this patent is extended or adjusted under 35 U.S.C. 154(b) by 71 days.

(21) Appl. No.: 17/900,520

(22) Filed: Aug. 31, 2022

(65) Prior Publication Data

US 2024/0067893 A1 Feb. 29, 2024

(51) Int. Cl.
*C10M 169/04* (2006.01)
*C10M 103/06* (2006.01)
(Continued)

(52) U.S. Cl.
CPC ........ *C10M 169/04* (2013.01); *C10M 103/06* (2013.01); *C10M 125/10* (2013.01);
(Continued)

(58) Field of Classification Search
CPC .............. C10M 169/04; C10M 103/06; C10M 125/10; C10M 125/20; C10M 125/26;
(Continued)

(56) References Cited

U.S. PATENT DOCUMENTS

| | | |
|---|---|---|
| 2007/0262120 A1 | 11/2007 | Coleman et al. |
| 2008/0166214 A1* | 7/2008 | Mandel .................. B24B 35/00 |
| | | 414/787 |

(Continued)

FOREIGN PATENT DOCUMENTS

| | | |
|---|---|---|
| CN | 210830213 U | 6/2020 |
| JP | H05-187446 A | 7/1993 |

(Continued)

OTHER PUBLICATIONS

Mounet et al., "Two=dimensional materials from high-throughput computational exfoliation of experimentally known compounds," Nat. Nanotech. 2018 doi: 10.1038/s41565-017-0035-5.

(Continued)

*Primary Examiner* — Ellen M McAvoy
(74) *Attorney, Agent, or Firm* — BROOKS KUSHMAN P.C.

(57) ABSTRACT

A device includes a tribological assembly including first and second mechanical components in relative motion with respect to each other, the assembly having a silver-alloy surface and an additive lubricant including at least one component of the formulas (Ia) or (II): $M_xNO_y$ (Ia), where M is Ca, V, Sb, Ni, or Ag, x (M:N ratio) is any number between 0.25 and 2, and y (O:N ratio) is any number between 1 and 8; $M_xSiO_y$ (II), where M is Mg or Al, x (M:Si ratio) is any number between 0.5 and 2, and y (O:Si ratio) is any number between 2.5 and 6, the device being a sealed constant-pressure device.

20 Claims, 5 Drawing Sheets

(51) Int. Cl.
    *C10M 125/10*     (2006.01)
    *C10M 125/20*     (2006.01)
    *C10M 125/26*     (2006.01)
    *F16H 51/02*     (2006.01)
    *C10N 40/14*     (2006.01)
    *C10N 50/08*     (2006.01)
    *H05B 3/00*     (2006.01)

(52) U.S. Cl.
CPC ........ *C10M 125/20* (2013.01); *C10M 125/26* (2013.01); *F16H 51/02* (2013.01); *C10M 2201/0603* (2013.01); *C10M 2201/061* (2013.01); *C10M 2201/082* (2013.01); *C10M 2201/086* (2013.01); *C10M 2201/102* (2013.01); *C10N 2040/14* (2013.01); *C10N 2050/08* (2013.01); *H05B 3/0004* (2013.01)

(58) Field of Classification Search
CPC .... C10M 2201/0603; C10M 2201/061; C10M 2201/082; C10M 2201/086; C10M 2201/102; F16H 51/02; C10N 2040/14
See application file for complete search history.

(56) References Cited

U.S. PATENT DOCUMENTS

| | | | | |
|---|---|---|---|---|
| 2008/0227372 | A1* | 9/2008 | Mandel | B24B 37/04 451/324 |
| 2010/0255762 | A1* | 10/2010 | Mandel | B24B 1/00 451/60 |
| 2010/0307215 | A1* | 12/2010 | Morales | C23D 5/00 427/256 |
| 2013/0274157 | A1 | 10/2013 | Zozulya et al. | |
| 2015/0275122 | A1* | 10/2015 | Schnipke | C22F 1/183 148/695 |
| 2017/0211174 | A1* | 7/2017 | Ramm | C23C 14/325 |
| 2017/0369813 | A1* | 12/2017 | Malshe | C10M 169/042 |
| 2018/0209311 | A1* | 7/2018 | Heckendorn | C22C 38/24 |
| 2020/0369977 | A1 | 11/2020 | Wieber et al. | |
| 2023/0063820 | A1* | 3/2023 | Schweigkofler | C23C 28/00 |

FOREIGN PATENT DOCUMENTS

| | | |
|---|---|---|
| JP | 2007-127202 A | 5/2007 |
| JP | 2008051179 A | 3/2008 |
| KR | 10-2021-0026337 A | 3/2021 |
| WO | 2021155968 A1 | 8/2021 |

OTHER PUBLICATIONS

Naguib et al., "Synthesis of Two-Dimensional Materials by Selective Extraction," ACS Nano , 2014 , 128-135.

Jain, Anubhav, et al. "Commentary: The Materials Project: A materials genome approach to accelerating materials Innovation," APL materials 1.1. (2013).

Scharf, Prasad J. Mater. Sci. 2013 "Solid Lubricants: a review" 48:511-531.

Zhu et al., "Barium Chromate as a Solid Lubricant for Nickel Aluminum," Trib. Trans. (2012).

Kimura et al., Elsevier, "Boron nitride as a lubricant additive" Wear 232 (1999), 199-206.

Jiao et al., "The tribology properties of alumina/silica composite nanoparticles as lubricant additives," App. Surf. Sci. 257 (2011) 5720-5725.

Gruetzmacher et al., "Superior Wear-Resistance of Ti3C2Tx Multilayer Coatings" ACS Nano (2021), 15, 5, 8216-8224.

Wang, B. et al. "Nano Serpentine Powders as Lubricant Additive: Tribological Behaviors and Self-Repairing Performance on Worn Surface," Nanomaterials, 2020, vol. 10, Article No. 922, pp. 1-12, pp. 1-2.

International Search Report dated Dec. 15, 2023 which issued in corresponding PCT/US2023/031528. 4 pages.

NPL_ISR & Written Opinion dated Jan. 3, 2024 for related PCT/US2023/031521 application. 10 pages.

* cited by examiner

TRIBOLOGICAL SYSTEM

TECHNICAL FIELD

The present disclosure relates to a tribological system with restricted use of lubricant, devices including the system, and method of forming the same.

BACKGROUND

Many assemblies and systems feature friction between individual components. The friction may generate unwanted particles which may further negatively impact sensitive components on the system, for example by shorting circuitry. While lubricants or substances designed to minimize or eliminate the friction have been used for centuries, the lubricants are typically not suitable for use in combination with open electronic circuit, in low pressure systems, in vacuum conditions, etc.

SUMMARY

In at least one embodiment, a device is disclosed. The device may include a tribological assembly including first and second mechanical components in relative motion with respect to each other, the assembly having a silver-alloy surface and an additive lubricant including at least one component of the formulas (Ia) or (II):

$$M_xNO_y \tag{Ia}$$

where
M is Ca, V, Sb, Ni, or Ag,
x (M:N ratio) is any number between 0.25 and 2, and
y (O:N ratio) is any number between 1 and 8;

$$M_xSiO_y \tag{II}$$

where
M is Mg or Al,
x (M:Si ratio) is any number between 0.5 and 2, and
y (O:Si ratio) is any number between 2.5 and 6,
the device being a sealed constant-pressure device.

The additive lubricant may further include at least one compound of the formula (III):

$$M_xCrO_y \tag{III}$$

where
M is any transition metal,
x (M:Cr ratio) is any number between 0.1 and 2, and
y (O:Cr ratio) is any number between 1 and 6.

The additive lubricant may include an exfoliating material. The additive lubricant may also include boron nitride. The additive lubricant may include a compound of formula (Ia), where the M is Ca or Sb. The tribological assembly may be located gravitationally upstream from one or more exposed electronic contacts. The device may also include an external electrical circuit connected to the first and second mechanical components and configured to generate Joule heating to increase viscosity of the additive to embed friction-generated particulates within the additive. The device may further include a printed circuit board.

In another embodiment, a vacuum device is disclosed. The device may include one or more exposed electronic contacts; and a tribological assembly including first and second mechanical components in relative motion with respect to each other, the assembly having a nickel phosphide surface and an additive lubricant including at least one component of the formulas (I) or (III):

$$M_xNO_y \tag{I}$$

where
M is any transition metal,
x (M:N ratio) is any number between 0.5 and 10, and
y (O:N ratio) is any number between 1 and 4;

$$M_xCrO_y \tag{III}$$

where
M is any transition metal,
x (M:Cr ratio) is any number between 0.1 and 2, and
y (O:Cr ratio) is any number between 1 and 6,
the device being a sealed vacuum device.

The additive lubricant may include one compound of formula (I) and one compound of formula (III) in a ratio of 2:1.

The device may also include at least one compound of formula (II):

$$M_xSiO_y \tag{II}$$

where
M is Mg or Al,
x (M:Si ratio) is any number between 0.5 and 2, and
y (O:Si ratio) is any number between 2.5 and 6.

The device may also include an external electrical circuit connected to the first and second mechanical components and configured to generate Joule heating to temporarily decrease the viscosity of the additive to embed friction-generated particulates within the additive. The additive may include $V_6N_2O_{16}$. The additive may further include a solid exfoliating material. The additive may be electrically insulating.

In yet another embodiment, a vacuum sealed assembly is disclosed. The assembly may include a tribological surface area including first and second mechanical component in relative motion with each other and an additive lubricant in contact with the tribological surface area, the additive lubricant embedding particulate material generated by friction in the tribological surface area, the additive lubricant including at least one component of the formula (I):

$$M_xNO_y \tag{I}$$

where
M is any transition metal, Ca, or Sb,
x (M:N ratio) is any number between 0.25 and 10, and
y (O:N ratio) is any number between 1 and 8.

The assembly may include a silver alloy surface. The assembly may include a nickel phosphide surface. The assembly may further include at least one compound of formula (II):

$$M_xSiO_y \tag{II}$$

where
M is Mg or Al,
x (M:Si ratio) is any number between 0.5 and 2, and
y (O:Si ratio) is any number between 2.5 and 6.

The assembly may further include one or more exposed electronic contacts.

DETAILED DESCRIPTION

Figure 1:
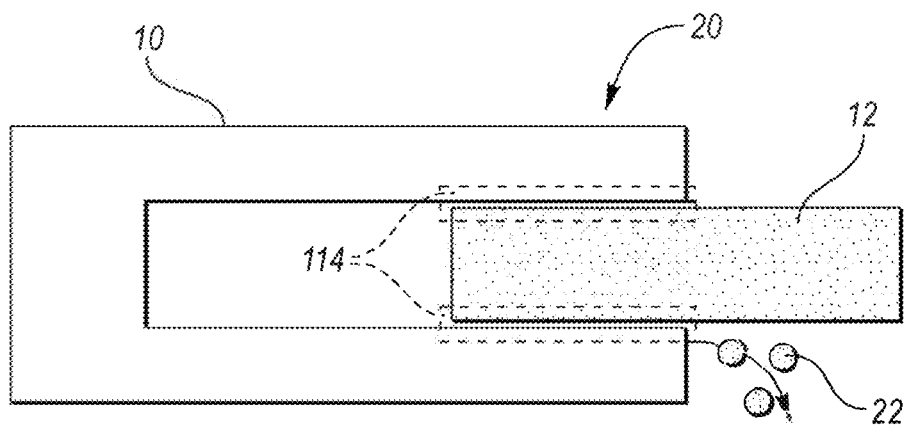
FIG. 1 shows a schematic of a prior art contact surface where undesirable particulate material is generated by excessive friction.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "substantially," "generally," or "about" means that the amount or value in question may be the specific value designated or some other value in its neighborhood. Generally, the term "about" denoting a certain value is intended to denote a range within +/−5% of the value. As one example, the phrase "about 100" denotes a range of 100+/−5, i.e. the range from 95 to 105. Generally, when the term "about" is used, it can be expected that similar results or effects according to the invention can be obtained within a range of +/−5% of the indicated value. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4, . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits. Similarly, whenever listing integers are provided herein, it should also be appreciated that the listing of integers explicitly includes ranges of any two integers within the listing.

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

For all compounds expressed as an empirical chemical formula with a plurality of letters and numeric subscripts (e.g., $CH_2O$), values of the subscripts can be plus or minus 50 percent of the values indicated rounded to or truncated to two significant figures. For example, if $CH_2O$ is indicated, a compound of formula $C_{(0.8-1.2)}H_{(1.6-2.4)}O_{(0.8-1.2)}$. In a refinement, values of the subscripts can be plus or minus 30 percent of the values indicated rounded to or truncated to two significant figures. In still another refinement, values of the subscripts can be plus or minus 20 percent of the values indicated rounded to or truncated to two significant figures. The terms "compound" and "composition" are used interchangeably.

As used herein, the term "and/or" means that either all or only one of the elements of said group may be present. For example, "A and/or B" means "only A, or only B, or both A and B". In the case of "only A", the term also covers the possibility that B is absent, i.e. "only A, but not B".

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" as a subset.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. First definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

In various manufacturing and assembly processes, materials may be required to slide against each other. To achieve a tight fit between the sliding parts, gaps are sometimes very small and cause large shear stresses in the contacting materials. These stresses may cause unwanted particle generation as material is flaked off of the contacting surfaces, as shown schematically in FIG. 1.

As can be seen in FIG. 1, a first component 10 and a second component 12 are sliding against each other as part of the assembly 20. The contact surfaces 14 of the components 10, 12 are exposed to high forces. As a result of the high-force abrasion, abrasively or friction-generated particles 22 are formed within the assembly 20.

The generated particles may cause issues such as mechanical obstruction (e.g. clogging ducts), electrical short circuits, chemical contamination, and abrasive wear of the assembly or its parts. The systems with such surfaces are called tribological, referring to the interaction of surfaces in relative motion.

The effects of tribology are realized when two or more surfaces meet each other, be it liquid-liquid, liquid-solid, or otherwise. There are many ways in which the surfaces can interact with each other, and the tribological interactions can take the from of frictional forces, surfaces adhering to each other, surfaces being kept apart from each other, and stress or strain at a surface contact point.

Tribology is not straightforward because surfaces are complex. Tribology is of heightened importance in applications involving lubricants/oils and solid components such as in industrial machinery and automotive parts. The presence of multiple phases under a mechanically shearing environment may also cause the surfaces to attract contaminants which adds more complex dynamics alongside the variety of materials, chemicals, and/or thicknesses of these materials used in the systems.

Additionally, surfaces are not flat despite being frequently depicted as such. In reality, surfaces are rough. The roughness may range from visibility with the naked eye to the nano and Angstrom levels. Surface roughness plays an important role and may influence the contact area of a surface, the contact stresses on a surface, the lubrication pathways, the contact angle between a solid and liquid surface, chemical compatibility, shear strength, and lubrication properties of a surface.

The contact of the multi-surface generates friction, a force between two components in contact with each other. Friction describes the resistance to the relative motion. The frictional forces occur at the interface between the two surfaces in relative motion. Mechanical abrasion is an interaction occurring when the two surfaces meet. Mechanical abrasion is influenced by elastic and plastic deformations of the surfaces.

A typical solution to preventing generation of debris and unwanted particles during frictional events has been to add a lubricant at the contact point between the first and second components which allows deformation of the lubricant surface rather than the underlying material, thereby avoiding particle generation. But in certain scenarios, performant lubricants are not allowed or available due to chemical restrictions or other application-specific constraints such as:

In low-pressure or vacuum environments, a lubricant may be required to have low off-gassing, to ensure the pressure in a sealed environment is constant over the lifetime of the device.

An inorganic lubricant may be preferable, to minimize reactivity with other components of the system.

In electronic devices, there may be a requirement that the lubricant be electrically insulating, lest particles of the lubricant create a short circuit in the device. Alternatively, there may be a requirement that the lubricant not have a large dielectric constant to minimize the potential damage of electrostatic discharge (ESD) to the electronics.

If there is a substrate (printed circuit board (PCB), glass-socket, ceramic, hybrid), with surface mounted bare die components eventually, near the assembly joint, there may be requirements that the lubricant not contain materials that are corrosive to exposed silicon, silicon oxide, aluminum, and/or gold contacts. This requirement is particularly strong in cases where the device undergoes a high-temperature processing step (above 50° C.) which may degrade any lubricant that is present and accelerate unwanted chemical reactions.

Depending on the contacting materials, there may be side reactions between the lubricant and a base material which may be undesirable.

Hence, there is a need for an alternative way to minimize or eliminate generation of abrasively-generated particles as part of assemblies or systems, especially the ones containing electrical circuits which may be susceptible to unwanted contact with the particles.

In one or more embodiments, a tribological system or assembly is disclosed. The system or assembly is a mechanical system including at least two mechanical parts. The tribological system is a system including at least two contacting parts or components having interacting, tribological surfaces.

The system may have environmental limitations regarding use of lubricant. For example, the system may be restricted to no off-gassing, no chemical reactions, no generation of electrostatic discharge, thermal stability requirement, the like, or a combination thereof.

The system may include or be a part of a high vacuum and/or low pressure device. High vacuum refers to a pressure low enough that the mean free path of molecules in the residual gas is greater than the dimensions of the vacuum vessel. High vacuum may be a vacuum with pressure in the range from about 100 mPa to 100 nPa. Low pressure may mean a pressure much less than atmospheric pressure. Low pressure may mean pressure of less than about 10 bar. The system may also have pressure above atmospheric pressure. Medium pressure may mean about 10 bar to about 100 bar. High pressure may mean more than about 100 bar.

The system or device may have pressure equal to or greater than about 1013.25 hPa. An internal design of the system or device may have pressure of "low vacuum" as defined in ISO 3529.

The system may be structured and/or required to maintain a certain value or range of pressure(s) throughout its lifetime, be it vacuum, high vacuum, low pressure, or above average pressure. The system or device may be a constant-pressure system or device, referring to the requirement of maintaining the same pressure over the lifetime of the device or system.

The system may include one or more exposed electronics such as electrical circuits or circuitry which may be susceptible to malfunction/failure if contamination occurs. The system may include one or more exposed electrical contacts. The electronics and/or other sensitive parts may be spatially removed from the tribological components, the additive, the external circuit, or a combination thereof. The electronics and/or other sensitive parts may be free of a contact with the tribological contact area or not be in direct contact with the tribological contact area. The electronics and/or other sensitive parts may be located in the vicinity of the tribological system such that the electronics and/or other sensitive parts may be subjected to exposure of the particulate matter generated by friction of the tribological components. The electronics and/or other sensitive parts may be located gravitationally downstream from the tribological components. The tribological components may be gravitationally upstream from the electronics and/or other sensitive parts.

The system or assembly disclosed herein may include or be part of a device having a silver-plated metal or coating, silver-alloy surface, and/or nickel phosphide (NiP) surface, and/or another component or material which requires lubrication despite the system also having at least one or more of the environmental limitations discussed above. For example, the system or device may include a silver-plated metal on at least one component in the tribological area and one or more exposed electrical contacts. Alternatively, the system or device may include a silver-alloy and a low pressure requirement. In another non-limiting example, the system or device may include a NiP surface, exposed electrical circuitry, and a requirement for no off-gassing.

The system may include a first component and a second component. The first component has a first contact surface or tribological contact surface. The second component has a first contact surface or tribological contact surface. The first and second tribological surfaces form a tribological contact area shared by the first and second components. The components may have additional contact surfaces.

The components may share at least one, one, two, at least two, or more than one contact surfaces and tribological contact areas. The system may include additional components with at least one contact surface each. The contact surfaces and contact areas may be shared between the components. The number of components may be 2, 3, 4, 5, 6, 7, 8, 9, 10, or more. The tribological system may be an industrial machinery system, an automotive system, or a sensing system. The tribological parts or first, second components may be bearings, seals, pins, springs, gears, cams, tappets, piston rings, electrical brushes, cutting tools, forming tools, the like, or a combination thereof.

The first and second components may be in relative motion. The relative motion generates friction which may produce friction-induced particle generation. The system may thus include a plurality of friction-induced particles. The first and second components may be static under some circumstances.

Additionally, the system may include an additive. The additive may be applied onto the one or more contact surfaces (tribological contact areas) of the first component, second component, etc. The additive may be applied along the entire length of a contact surface, a portion of the contact surface, or extend beyond the contact surface such that the additive is applied onto the contact and non-contact surface of the first component, second component, or both. The additive may cover the entire or partial extent of the tribological surface area. The additive may form a thin film between the contact surfaces of the components.

The additive may include a lubricant or a substance used for minimizing friction, heat, and/or wear. The lubricant may include a boundary lubricant, mixed lubricant, or full film lubricant.

The additive may be chemically inert. The additive may be inert with respect to silicon, silicon oxide, aluminum, and/or gold contacts. The additive may be electrically insulating.

The additive may be subjected to a treatment having one or more steps. The treatment may include a step of Joule heating or resistive, resistance, or Ohmic heating, or inductive hearing, or a process by which the passage of an electric or magnetic current through a conductor produces heat. The treatment may include increasing, elevating, maintaining temperature of the component(s), system, additive until a predetermined temperature is reached. The treatment may also include a step of deactivating heating to reduce the temperature of the component(s), system, additive until a second predetermined temperature is reached.

The system may thus include an external circuit to produce the Joule heating. The external circuit may generate constant voltage to generate a large direct current. Alternatively, the external circuit may generate a high-frequency alternating current configured to minimize damage to other electrical components of the system. The voltage or current may be generated for a predetermined amount of time. The external circuit may be connected to the component(s) of the system.

The additive may have a high electrical resistance such that the additive and/or surface is not damaged by the treatment. The additive may have a high electrical resistance to maximally localize the Joule heating to the tribological contact surface. The additive may be a resistive additive or a material which does not readily allow electric current. The additive may be an exfoliating or exfoliable material or a layered material which may be separated into individual sheets.

The additive may be a liquid, gas, gel, or solid. The additive may be a solid inorganic lubricant in at least one state. The additive may have more than one state in the herein-described system.

The additive may be heated by the treatment and cooled after the treatment. The additive may be a substance having such properties that upon application onto one or more tribological areas, and the treatment, the additive may embed, enclose, surround, swallow, encompass, imbibe, or the like, and retain, keep, hold, or the like, the one or more friction-induced particles between the tribological contacts/in the tribological contact area. The particles remain within the additive such that the particles are not dislodged, do not move within the system, and do not impact the remainder of the assembly or system such as the electronics. The additive may be structured to capture the particles one or more times. The additive may be structured to capture the particles once, repeatedly, continuously, discontinuously, in a random pattern, or in a regular pattern.

The friction-induced particles, particulates, or particulate matter may be generated in the tribological contact area once, twice, or multiple times. The friction-induced particles may be metallic, non-metallic, or both. The friction-induced particles may be of various sizes, shapes, and/or compositions.

The additive may be a polymer with a glass transition temperature or melting point between about 25 and 250, 50 and 200, or 75 and 150° C. such that the treatment allows the polymer to flow around any particles generated in the contact region, trapping them in place after the treatment is completed and the polymer cools down. The glass transition temperature may be about, at least about, or at most about 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, or 250° C.

The additive may be a non-polymeric material with a melting temperature of about 25 and 250, 50 and 200, or 75 and 150° C. The melting temperature may be about, at least about, or at most about 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, or 250° C.

Similarly, to a polymeric additive, the treatment may allow the additive to reach and/or exceed the melting temperature such that the additive's flow characteristics enable capture of the particles. After the treatment is terminated, the additive may cool down and solidify or become gel-like, remaining within the tribological area.

The additive may have an original viscosity or first viscosity at which the additive is applied into the system. The additive may have a second viscosity or viscosity at an elevated temperature generated by the treatment described herein (melting temperature, glass transition temperature). The additive may have a third viscosity at a temperature after the treatment has been deactivated. The third viscosity may be a final viscosity of the additive. The third viscosity may be a viscosity of the cooled down additive. The third viscosity may equal the first viscosity, have a higher or lower value than the first viscosity. The first viscosity and the third viscosity are higher than the second viscosity. The viscosity may refer to dynamic or kinematic viscosity.

The additive, the system, or both may have a first, second, and third state. In the first state, the additive may be a material having a first viscosity. In the first state, the additive may be applied onto the tribological area. In the first state, the additive may be a solid. For example, the additive may be the polymer described above. In the first state, the polymer may be a material below the glass transition temperature.

In the second state, the additive may be subject to the Joule heating described above, and the glass transition temperature may be reached and/or exceeded. The polymer may transition into a rubbery state, flow, or viscous flow. The polymer may become a flowing material having a second viscosity. The second viscosity enables the additive to capture any particles in the tribological area, as is discussed herein. In the second state, the additive may be heated by the Joule heating until the additive becomes at least partially melted.

In the third state, the Joule heating may be stopped, the polymer cools down, and the polymer characteristics change such that the polymer has a third viscosity which is different than the second viscosity. The third viscosity may be lower, higher, or equal to the first viscosity. The third viscosity enables the additive to retain any particles in the tribological area, as is discussed herein.

Figure 2A:
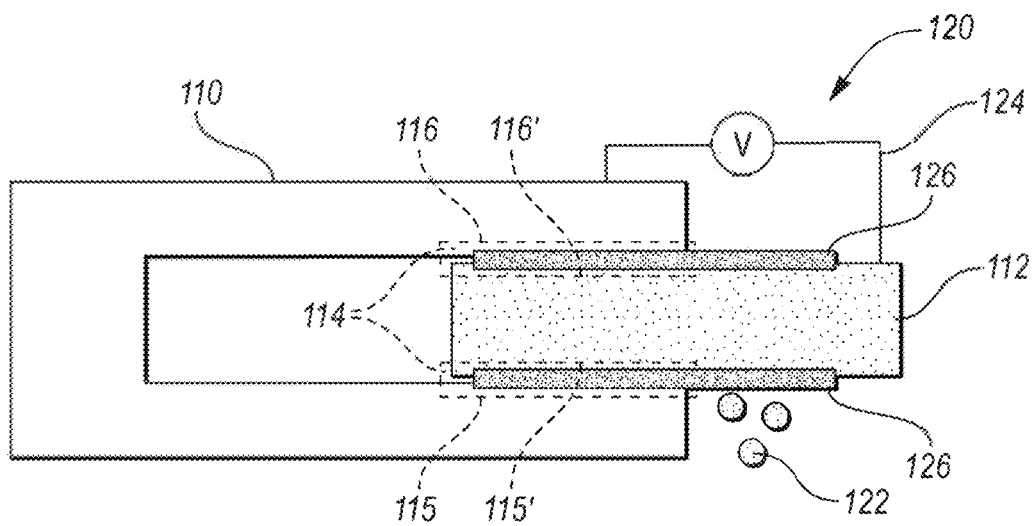
FIG. 2A shows a schematic of a non-limiting example of a system disclosed herein according to one or more embodiment in the first state.
Figure 2B:
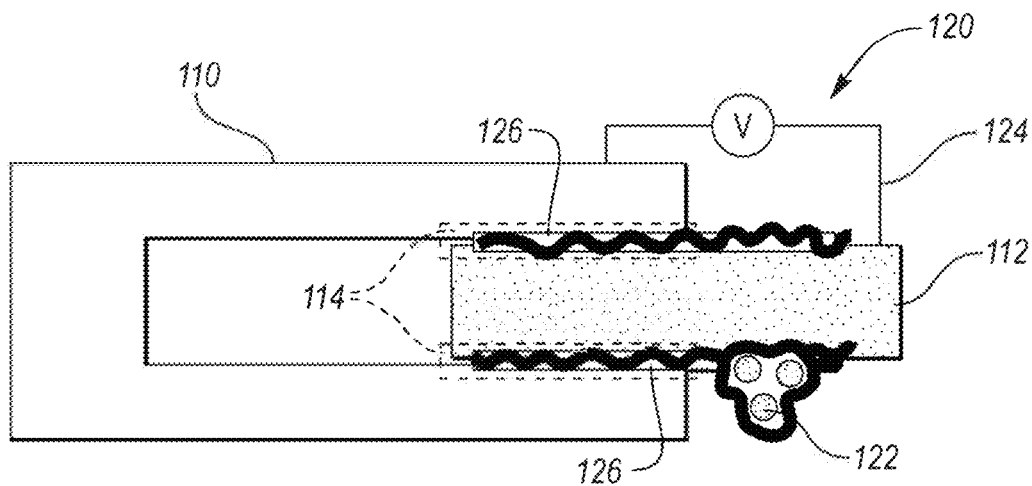
FIG. 2B shows a schematic of a non-limiting example of a system disclosed herein according to one or more embodiment in the second state.
Figure 2C:
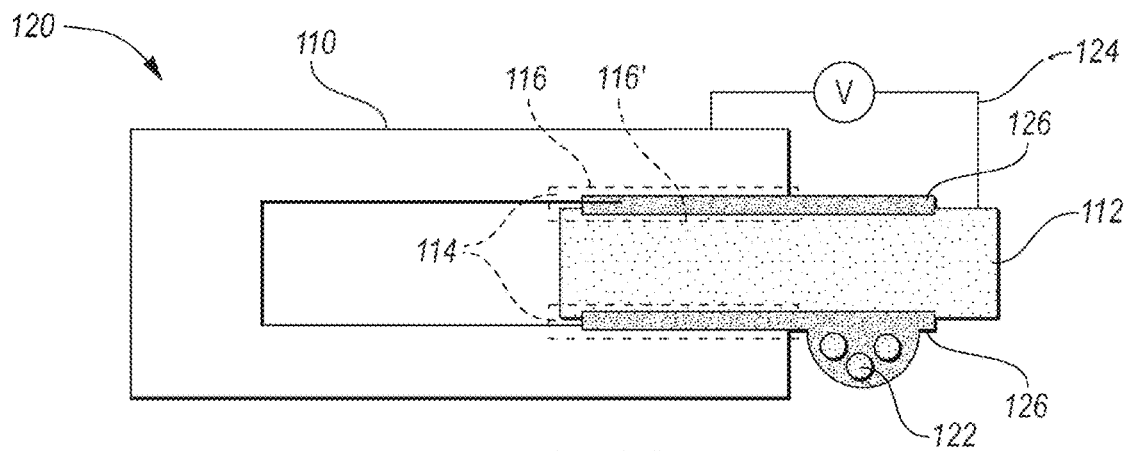
FIG. 2C shows a schematic of a non-limiting example of a system disclosed herein according to one or more embodiment in the third state.

FIGS. 2A-2C show non-limiting examples of the system described herein in the first, second, and third state. In FIG. 2A, the system is depicted in a first state. The system 120 includes a first component 110 having a first contact surface 115 and a second contact surface 116. The system 120 includes a second component 112 having a first contact surface 115' and a second contact surface 116'. The system 120 includes two tribological contact areas 114 between the components 110 and 112. The system 120 also includes an external circuit 124 configured to provide Joule heating to the additive 126. In the first state, the additive 126 is applied onto the tribological contact area or surfaces 114. In the first state, the first and second components 110, 112 may be in relative motion, thus generating friction producing the particles 122. The external circuit 124 may be active, activated, or non-active, deactivated in the first state.

FIG. 2B shows the system in the second state. After the external circuit 124 is activated, generating electric current, the additive 126 may be heated above the glass transition temperature in case of the additive being a polymer. Alternatively, the additive may be heated to or above its melting temperature. Alternatively, or in addition, in the second state, the Joule heating may eliminate volatile components such as volatile organic compounds (VOCs) produced by the additive and thus prevent off-gassing from the lubricant post-assembly.

In the third state, depicted in FIG. 2C, the external circuit 124 may be deactivated, the additive 126 is cooled down to such state of the additive that the additive has flow characteristics conducive to capturing and/or holding of the particles 122. The particles 122 may be trapped within the additive. The particles 122 may be adhered to the tribological area via the additive 126. In the third state, the additive with the captured particles may harden and become less viscous in time. In the third state, the additive may be a gel, solid, or both.

The particles 126 may be generated in the first state, second state, third state, or a combination thereof.

In a non-limiting example, in the first state, the system and/or additive may be heated to a predetermined temperature. The predetermined temperature is a temperature of removal of undesirable volatile compounds from the system. The system and/or additive may be heated to the predetermined temperature once, twice, more than one time, multiple times, in regular or irregular intervals.

In another non-limiting example, the additive may be a solid having a first temperature and first viscosity. In the second state, the additive may be heated to at least a melting temperature of the additive such that the additive has flow characteristics to capture the unwanted particles. The heating may be provided by the external circuit's Joule heating. In the second state, the additive may become more fluid-like and less viscous, having a second viscosity lower than the first viscosity. In the second state, the additive may capture the particles. In the third state, the external circuit may be disconnected or deactivated, the additive may cool down, become solid or gel, having a third temperature and third viscosity. The first and third temperature, viscosity, or both may be about equal, the same, or different. The second temperature is higher than the first and third temperature, respectively. The second viscosity is lower than the first and third viscosity, respectively.

Figure 3:
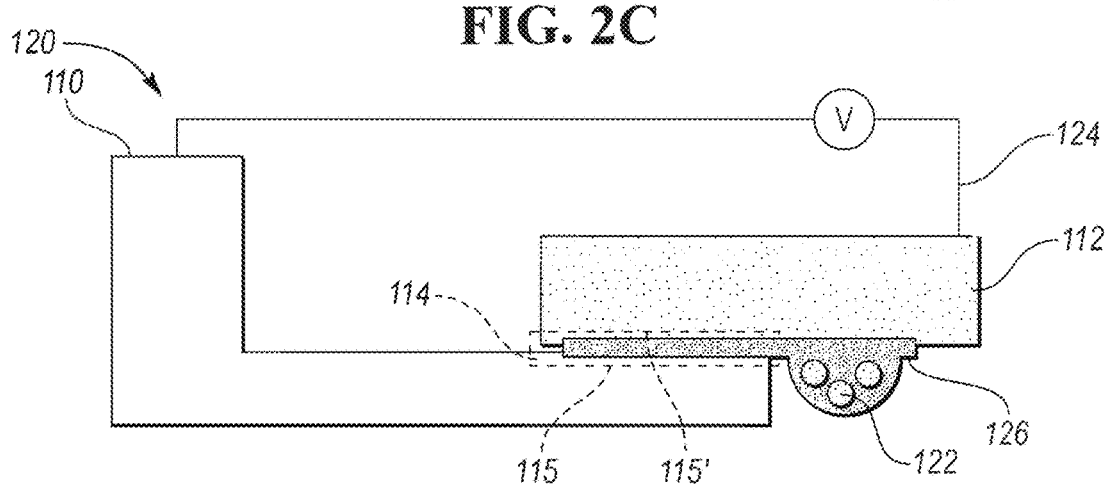
FIG. 3 shows a schematic depiction of another non-limiting example of a system disclosed herein according to one or more embodiment in the third state.

FIG. 3 shows the herein-disclosed system with a single tribological contact area 114 between the first and second components 110 and 112 in a third state. The first component has a tribological contact surface 115. The second component has a tribological contact surface 115'.

A device, part, assembly including the tribological system or assembly described herein is disclosed. The device may be a low-pressure device, a vacuum sealed device, a device with no off-gassing requirement, or another environmental requirement described herein. The device may include tribological components forming the tribological surface area and the additive. The additive may include or embed the particulate matter. The device may include the external electrical circuit described herein. Alternatively, the external circuit may be removed post-assembly. A non-limiting example of the device is schematically shown in FIG. 4.

Figure 4:
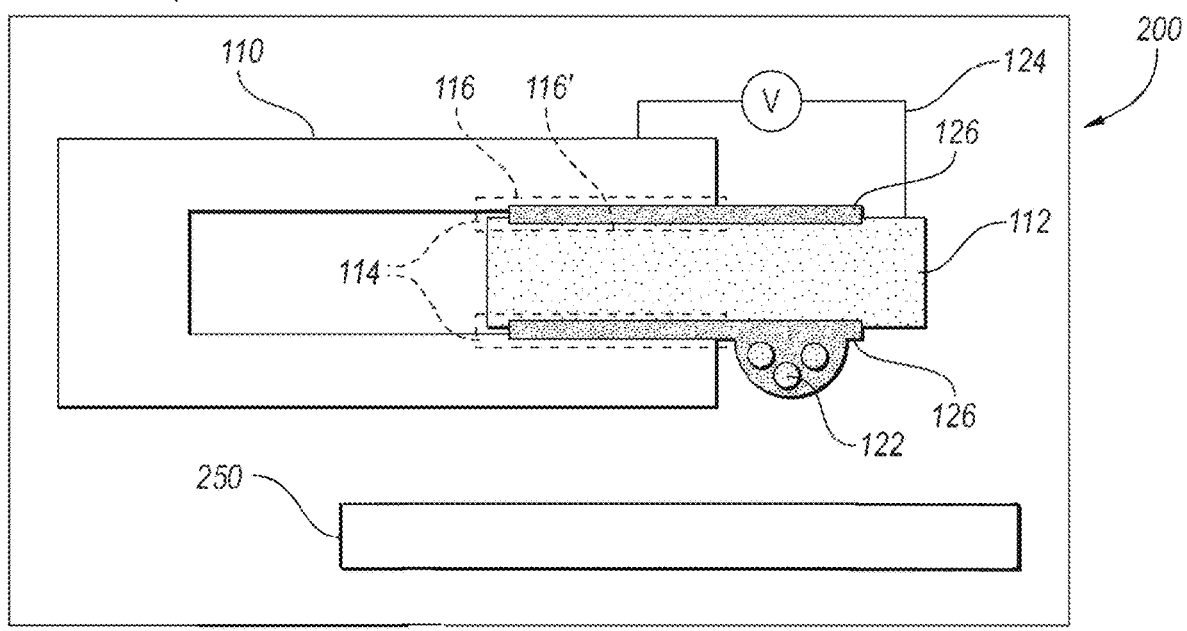
FIG. 4 shows a schematic depiction of a non-limiting example device including the tribological system described herein.

As can be seen in FIG. 4, the device 200 may include the tribological system 120 described herein and one or more electronics 250. The friction-generated particulate matter 122 is captured by the additive of the system 120 such that contact between the electronics and 250 and the particulate matter 122 is prevented.

A method of preventing abrasion-generated particle pollution of a tribological system is disclosed. The method may include introducing an additive, described above, and an external circuit, described above, into the tribological system. The introducing may include spray coating the exposed surfaces, electroporating, drop casting, solution deposition, the like, or a combination thereof.

The method may include activating the external circuit to generate voltage or current to provide Joule heating. The method may include heating the additive by the Joule heating for a predetermined amount of time to remove volatile components, increase temperature of the additive above its glass transition temperature or melting temperature, or both. The method may thus include decreasing viscosity of the additive to a point at which the additive melts, becomes liquid, becomes a flowing material, becomes a gel, and/or is present in the tribological contact area where the particles generated by friction are located. The method may include capturing the particles into or within the additive. Subsequently, the method may include cooling the additive by deactivating the external circuit to a predetermined temperature such that the additive reaches a state capable of holding the particles.

The method may include capturing the particles once, repeatedly, continuously, discontinuously, in a random pattern, in a regular pattern. The method may include activating the external circuit more than once to generate a change associated with the additive to remove volatile components and/or friction-generated particulates more than once.

The additive described above may include one or more compounds. The additive may include 100 wt. or vol. % of one compound. Alternatively, the additive may be a mixture having one or more compounds. The ratio or the compounds may be about, at least about, or at most about 1:1, 1:2, 1:3, 1:4, 1:5, 1:6, 1:7, 1:8, 2:3, 5:7, 1:1:1, 1:2:3, 1:4:1, or the like.

The additive may have the following composition described below. Alternatively, other compositions are contemplated. The additive described below may be used in the system described above in combination with the external circuit described above or without it. As such, the materials described below may be suitable lubricants in the herein-disclosed system with or without heating to a glass transition temperature/melting point, and subsequent cooling.

The additive may include one or more nitrates of the formulas (I), (Ia), silicates of the formula (II), chromates of the formula (III). The additive may include one or more of the following, either alone, or in a combination with one another, or in a combination with one or more compounds of the formulas (I), (Ia), (II), and/or (III): boron nitride (BN) with exfoliation energy of about 19 meV/Å$^2$, CsAgO with exfoliation energy of about <1 meV/Å$^2$, barium chromate (BaCrO4), graphite, graphene, oxidized graphite, oxidized graphene, nitrates free of transition metals, hydrated magnesium silicate, MXene materials such as TiCx. MXenes phases (MAX phases with a missing A atom) are exfoliable layered carbides and nitrides derived by removing the "A" cation from M$_m$AX$_n$ (m=n+1) "MAX phases." n is typically between 1 and 4, and X is carbon and/or nitrogen.

The additive may include a compound having a formula (I):

$$M_xNO_y \qquad (I)$$

where
M is any transition metal, Ca, or Sb,
x (M:N ratio) is any number between 0.25 and 10, and
y (O:N ratio) is any number between 1 and 8.

In the formula (I), M may be an element from the following Periodic Table of Elements groups: I.B, II.B, III.B, IV.B, V.B, VI.B, VII.B, VIII.B, II.A, or V.A. M may be Sc, Ti, V, Cr, Mn, Fe, Co, Ni, Cu, Zn, Y, Zr, Nb, Mo, Tc, Ru, Rh, Pd, Ag, Cd, La, Hf, Ta, W Re, Os, Ir, Pt, Au, Ac, Rf, Dd, Sg, Bh, Hs, Mt, Ds, Rg, Cn, Lanthanoid, Actinoid, Ca, or Sb. In a non-limiting example, M may be Ag such that the compound of formula (I) is AgNO$_2$ with exfoliation energy of 25 meV/Å$^2$.

In the formula (I), x may be about, at least about, or at most about 0.25, 0.5, 0.75, 1, 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, or 10. x may be any range between two numerals disclosed herein, for a example y may be 0.5-10.

In the formula (I), y may be about, at least about, or at most about 1, 2, 3, 4, 5, 6, 7, 8, 9, or 10. y may be any range between two numerals disclosed herein, for example 1-4.

The additive may include a compound having a formula (Ia):

$$M_xNO_y \qquad (Ia)$$

where
M is Ca, V, Sb, Ni, or Ag,
x (M:N ratio) is any number between 0.25 and 2, and
y (O:N ratio) is any number between 1 and 8.

In the formula (Ia), x may be about, at least about, or at most about 0.25, 0.5, 0.75, 1, 1.25, 1.5, 1.75, or 2. x may be any range between two numerals disclosed herein.

In the formula (Ia), y may be about, at least about, or at most about 1, 2, 3, 4, 5, 6, 7, or 8. y may be any range between two numerals disclosed herein.

The additive may include a compound having a formula (II):

$$M_xSiO_y \qquad (II)$$

where
M is Mg or Al,
x (M:Si ratio) is any number between 0.5 and 2, and
y (O:Si ratio) is any number between 2.5 and 6.

In the formula (II), x may be about, at least about, or at most about 0.5, 0.6, 0.7, 0.8, 0.9, 1.0, 1.1, 1.2, 1.3, 1.4, 1.5, 1.6, 1.7, 1.8, 1.9, or 2.0. x may be any range between two numerals disclosed herein.

In the formula (I), y may be about, at least about, or at most about 2.5, 3, 3.5, 4, 4.5, 5, 5.5, or 6. y may be any range between two numerals disclosed herein.

The compound of formula (II) may be an anhydrous silicate.

The additive may include a compound having a formula (III):

$$M_xCrO_y \qquad (III)$$

where
M is any transition metal,
x (M:Cr ratio) is any number between 0.1 and 2, and
y (O:Cr ratio) is any number between 1 and 6.

In the formula (III), M may be an element from the following Periodic Table of Elements groups: I.B, II.B, III.B, IV.B, V.B, VI.B, VII.B, or VIII.B. M may be Sc, Ti, V, Cr, Mn, Fe, Co, Ni, Cu, Zn, Y, Zr, Nb, Mo, Tc, Ru, Rh, Pd, Ag, Cd, La, Hf, Ta, W Re, Os, Ir, Pt, Au, Ac, Rf, Dd, Sg, Bh, Hs, Mt, Ds, Rg, Cn, Lanthanoid, or Actinoid.

In the formula (III), x may be about, at least about, or at most about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0. x may be any range between two numerals disclosed herein.

In the formula (III), y may be about, at least about, or at most about 1, 2, 3, 4, 5, or 6. y may be any range between two numerals disclosed herein.

Experimental Section

While in a vast chemical search space, it is nonobvious where to begin to search for materials that optimize a particular use-case. The strict conditions of the herein-described system impose many conditions which were considered for the search below.

Two search spaces were chosen for screening:
(A) 2D inorganic materials in the Materials Cloud database (MC2D) available at https://www.materialscloud.org/discover/2dstructures/dashboard/list; and
(B) All elemental, binary, and ternary nonradioactive materials in the Materials Project that have a hull energy of at least 25 meV/atom (38,432 materials).

(A) 2D Inorganic Materials

The 2D inorganic materials were chosen as their planes are joined by van der Waals (vdW) or similar forces and therefore may be easier to slip against each other, allowing the softness desired in a solid inorganic lubricant.

The following conditions were applied to the MC2D search to suit the restrictive environment of the system disclosed herein:
(a) A binding energy of no more than 30 meV/Å$^2$ to ensure exfoliability;
(b) Avoiding elements that commonly react with semiconductor contacts: halogens such as compounds including Cl, Br, I, F; sulfur such as sulphates; phosphates; phosphines; and gallium since the reactions are undesirable;
(c) Avoiding compound types which are chemically unstable in lubricant applications: selenides, tellurides, lithium-containing compounds, peroxides, and superoxides;
(d) Avoiding radioactive elements;
(e) Avoiding carbon;
(f) Avoiding conductors to prevent shorting in the system;
(g) Avoiding hydrogen-containing compounds to avoid oxidation and off-gassing; and
(h) Abundance (elemental) must be at least 5e-8 (50 ppb).

The restrictions generated a total of 89 unique compounds ranging from $Mg_3Si_2O_9$ (exfoliation energy <1 meV/Å$^2$) to P, SnO, and Sb (exfoliation energy ~30 meV/Å$^2$), partially listed in Table 1.

TABLE 1

2D inorganic materials identified in MC2D complying with the conditions (a)-(h).

| Formula | Exfoliation energy (eV/Å$^2$) | Band gap (eV) | Abundance |
|---|---|---|---|
| $Mg_3Si_2O_9$ | 0.000257 | 2.982944 | 2.900000e-02 |
| $Cs_4Ag_4O_4$ | 0.000770 | 1.177999 | 7.900000e-08 |
| $K_4Cu_4O_4$ | 0.001636 | 0.102455 | 6.800000e-05 |
| $MgZn_7O_8$ | 0.002025 | 1.849251 | 7.800000e-05 |
| $Ca_2O_2$ | 0.004134 | 2.617131 | 5.000000e-02 |
| $Mg_3P_2O_{16}$ | 0.004982 | 0.219309 | 9.900000e-04 |
| $Sb_4O_6$ | 0.005225 | 3.459846 | 2.000000e-07 |
| $Zn_2P_4O_8$ | 0.005657 | 2.748463 | 7.800000e-05 |
| $V_6O_{20}$ | 0.007655 | Lack of data | 1.900000e-04 |
| PbO | 0.007843 | 2.446158 | 9.900000e-06 |
| $Mg_3Si_4O_{12}$ | 0.008035 | 3.224486 | 2.900000e-02 |
| $Fe_2Si_4O_{12}$ | 0.008153 | 0.052190 | 6.300000e-02 |
| $CaN_2O_6$ | 0.008295 | 3.771712 | 2.000000e-05 |
| $V_4Cu_2P_4O_{28}$ | 0.008357 | Lack of data | 6.800000e-05 |
| $SbN_9$ | 0.008605 | 2.951962 | 2.000000e-07 |
| $V_6N_2O_{16}$ | 0.008737 | 0.160300 | 2.000000e-05 |
| $Mo_2O_8$ | 0.009201 | 1.004443 | 1.100000e-06 |
| $Fe_2P_2N_2O_{10}$ | 0.009612 | 0.834392 | 2.000000e-05 |
| $Sb_8N_4O_{24}$ | 0.009874 | Lack of data | 2.000000e-07 |
| $V_2NiP_2O_{10}$ | 0.009975 | 0.650801 | 8.900000e-05 |
| ... | ... | ... | ... |
| $K_2NaInAs_2$ | 0.028154 | 0.598328 | 1.600000e-07 |
| $WP_2O_8$ | 0.028701 | 2.107387 | 1.100000e-06 |
| GeP | 0.028789 | 1.730171 | 1.400000e-06 |
| $Sb_2O_3$ | 0.028814 | 2.539562 | 2.000000e-07 |
| $K_2Mo_6P_4O_{28}$ | 0.028855 | Lack of data | 1.100000e-06 |
| P | 0.029257 | 2.190508 | 9.900000e-04 |
| $Rb_2P_{30}$ | 0.029586 | Lack of data | 6.000000e-05 |
| Sb | 0.029591 | 1.231397 | 2.000000e-07 |
| $K_2P_{30}$ | 0.029776 | Lack of data | 9.900000e-04 |
| SnO | 0.029831 | 3.013782 | 2.200000e-06 |

(B) Binary, and Ternary Nonradioactive Materials

A reactivity screening was conducted on the vast 38,432 materials of the Materials Project material database which were identified as having a hull energy of at least 25 meV/atom.

The reactivity screening is the likelihood of a reactivity between the composition C and a reactant R. Using the convex-hull methodology, the reactivity was computed by examining (1) the decomposition products of a composition C+x R and (2) the relative decomposition energy of ε(x)=E(C+x R)−E(C)−x E(R) (a nonpositive number). The most stable reaction was the one that had the minimum E, while the dilute limit was the lowest value of x that has a nonzero E.

The reactivity was benchmarked to some known material C' using the following two quantities:
  (a) At which molar fraction x does the reaction occur? A higher reactivity was associated with a higher value of x, i.e. more of the reaction occurs per molar unit of C (or C'). A typical metric here is: $RR_{stoich}=x_C/x_{C'}$, where C' is the reference material and RR stands for the relative reactivity.
  (b) What is the relative decomposition energy ε? A higher reactivity was associated with a lower value of ε (higher absolute value), i.e. the reaction is more energetically favorable. A typical metric here is: $RR_{en}=\varepsilon_C/\varepsilon_{C'}$, where C' is the reference material. It can also be: $RR_{en}=(\varepsilon_C-\varepsilon_{C'})/k_BT$, where $k_B$ is the Boltzmann constant and T is the absolute temperature.

Figure 5A:
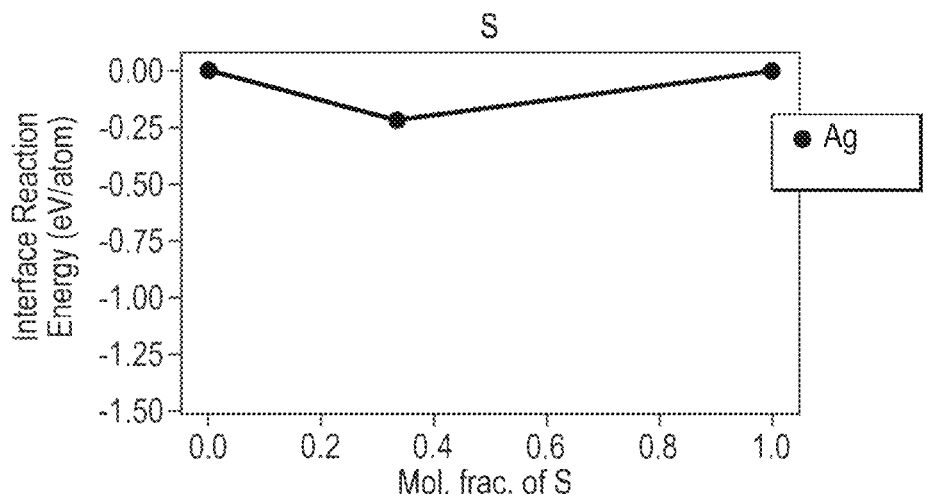
FIGS. 5A-5C show non-limiting examples of interfacial reactivity metric, depicting a moderately reactive interface (Ag—S) in FIG. 5A, non-reactive interface (S—Ne) in FIG. 5B, and a highly reactive interface (Ag—F2) in FIG. 5C.
Figure 5B:
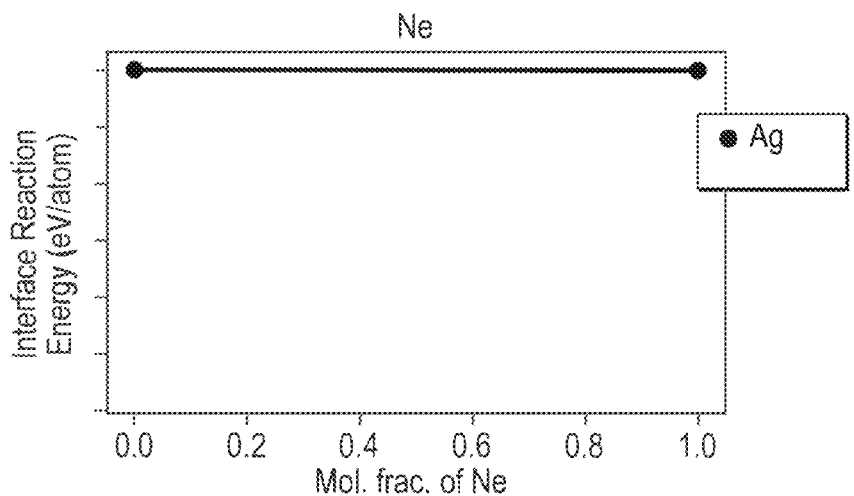
Figure 5C:
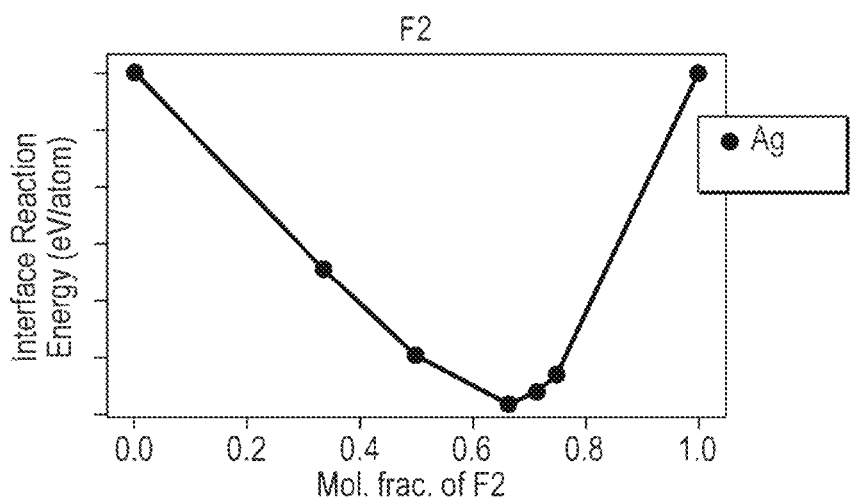

For the reactivity screening, sulfur (S) was used as a reference material. FIGS. 5A-5C show example individual interfaces. In FIG. 5A, the moderately reactive interface of S—Ag shows a small reactivity of 250 meV at $Ag_2S$, which is known as "tarnish." FIG. 5B shows a non-reactive interface of S—Ne which do not react as neon is a noble gas. FIG. 5C shows a highly reactive interface of Ag—F2 as fluorine is extremely reactive with a very high energy of forming silver fluoride.

Figure 6:
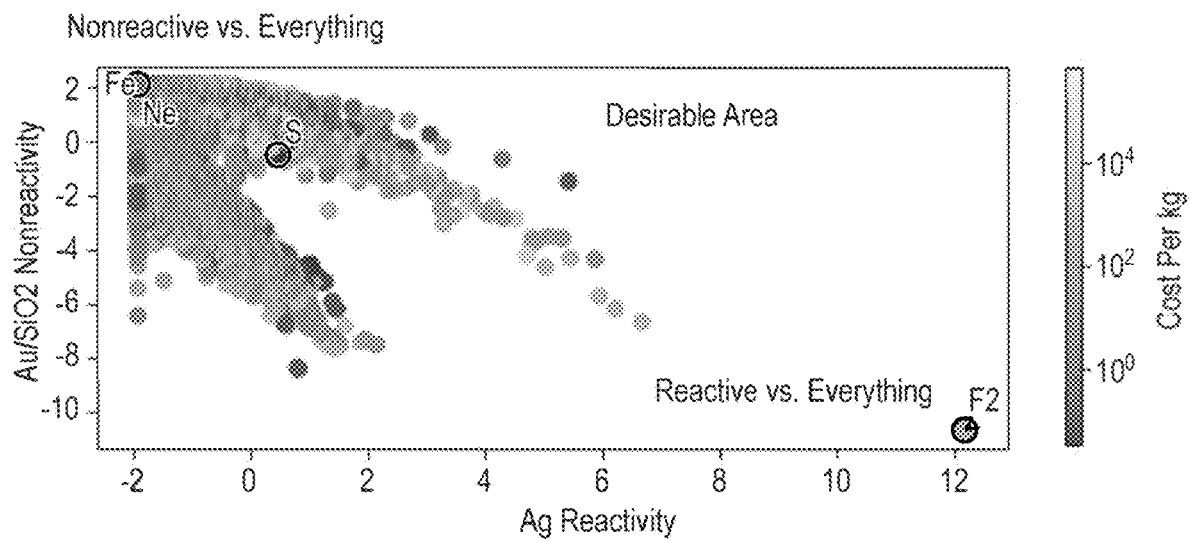
FIG. 6 shows a scatterplot of reactivity of screened materials against Ag, Au, and $SiO_2$.

A scatterplot shown in FIG. 6 was identified by compressing the results above into a single scalar reactivity view. The axes in FIG. 6 represent the "reactivity" metric defined earlier: $(RR_{stoich}+RR_{en})*0.5$, multiplied by 1 for "reactivity" and −1 for "nonreactivity." The reference material was elemental sulfur. As can be seen from FIG. 6, fluorine is extremely reactive, iron, and neon are fairly nonreactive, and sulfur is in the middle. Materials in the top right of the plot are the targets, corresponding to compounds which react strongly with Ag, allowing them to form a stable tribological surface layer, but not with Au or $SiO_2$ so as to prevent any degradation of electrical components. Cost of the compounds was also considered and is indicated in FIG. 6.

Figure 7:
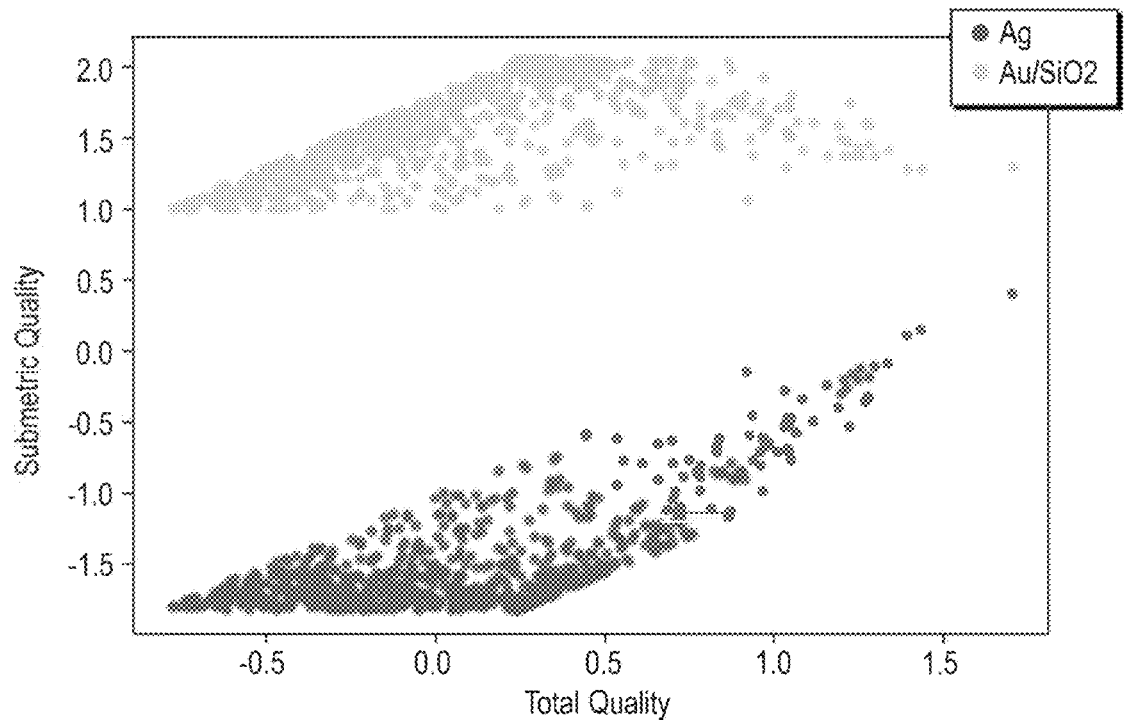
FIG. 7 shows a scatterplot of summarized reactivity of screened materials against Ag, Au, and $SiO_2$.

Subsequently, the materials in the top-right area of the plot became the focus as they were closest to the desired region. The reactivity metrics were compressed into a single metric $R=R_1+R_2$, targeting $R_{Ag}>1.8$ and $R_{Au/SiO2}>1$. Materials including halogens, sulfur, selenium, tellurium, gold, and gallium were removed. The resulting scatterplot of 667 materials is shown in FIG. 7. This provided a shortlist of materials that are most likely to have the desired behavior and therefore may provide the optimal design principles of interest.

Figure 8:
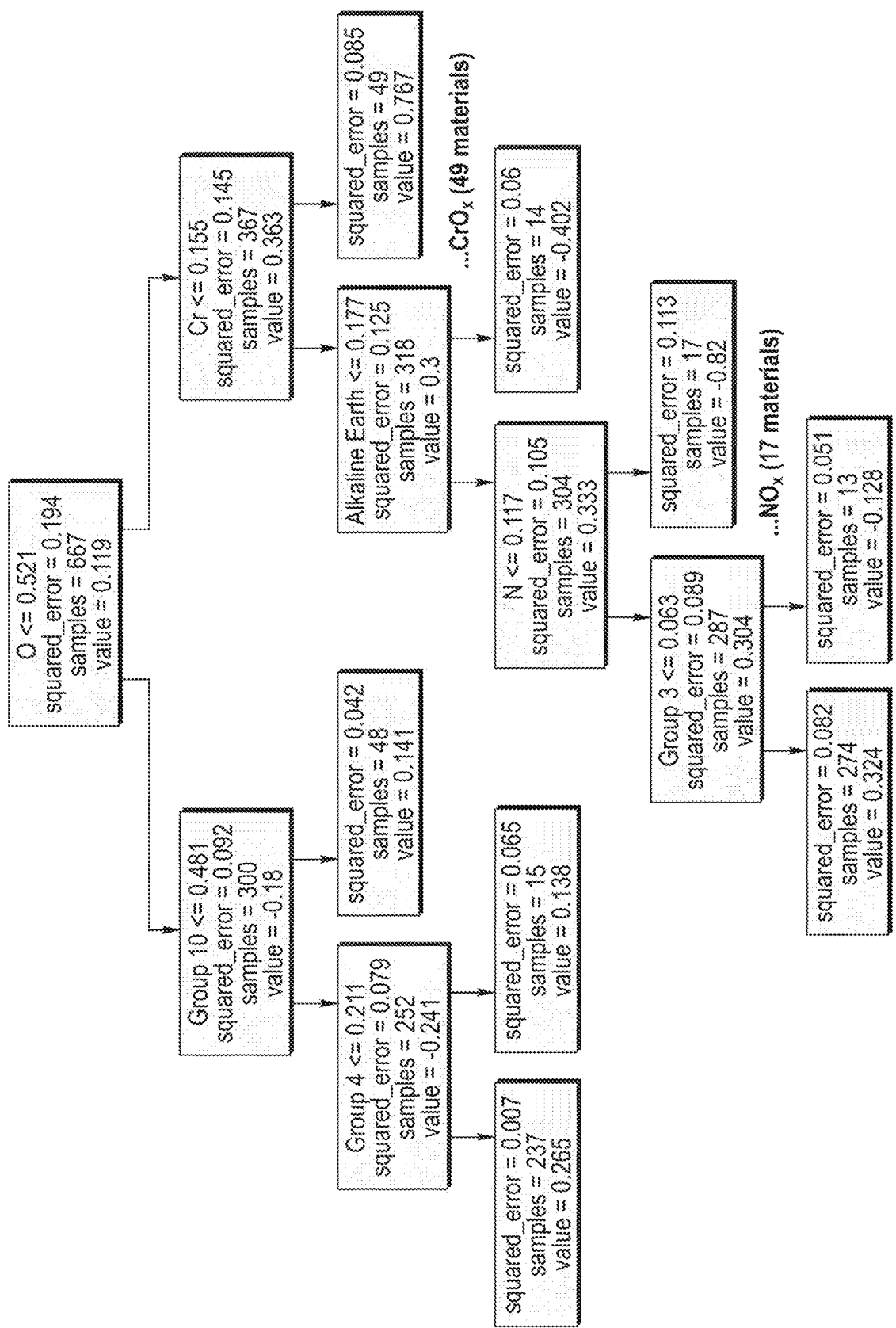
FIG. 8 shows an optimized decision tree identifying the chemical spaces best suited for high reactivity with Ag and low reactivity with Au and $SiO_2$.

The 667 materials were input to a decision tree with hyperparameter optimization, shown in FIG. 8. The validation score was 0.561 and the test score was 0.519, indicating a slight amount of hyperparameter overfitting. In the plotted decision tree, darker colors corresponded to a higher quality score $(R_1+R_2)$. The most viable materials which emerged were as follows: 49 materials that contain $CrO_x$, 17 materials that contain $NO_x$, and 274 materials that are otherwise transition metal oxides without Cr or N. $CrO_x$ and $NO_x$ compounds were identified as the strongly performing candidates, well-suited for high reactivity with Ag and low reactivity with Au and $SiO_2$.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A device comprising:
  a tribological assembly including first and second mechanical components in relative motion with respect to each other, the assembly having a silver-alloy surface and an additive lubricant including at least one component of the formulas (Ia) or (II):

where
  M is Ca, V, Sb, Ni, or Ag,
  x (M:N ratio) is any number between 0.25 and 2, and
  y (O:N ratio) is any number between 1 and 8;

where
  M is Mg or Al,
  x (M:Si ratio) is any number between 0.5 and 2, and
  y (O:Si ratio) is any number between 2.5 and 6,
  the device being a sealed constant-pressure device.

2. The device of claim 1, wherein the additive lubricant further comprises at least one compound of the formula (III):

where
  M is any transition metal,
  x (M:Cr ratio) is any number between 0.1 and 2, and
  y (O:Cr ratio) is any number between 1 and 6.

3. The device of claim 1, wherein the additive lubricant includes an exfoliating material.

4. The device of claim 1, wherein the additive lubricant further includes boron nitride.

5. The device of claim 1, wherein the additive includes a compound of formula (Ia) and the M is Ca or Sb.

6. The device of claim 1, wherein the tribological assembly is located gravitationally upstream from one or more exposed electronic contacts.

7. The device of claim 1, further comprising an external electrical circuit connected to the first and second mechanical components and configured to generate Joule heating to increase viscosity of the additive to embed friction-generated particulates within the additive.

8. The device of claim 1 further comprising a printed circuit board.

9. A vacuum device comprising:
one or more exposed electronic contacts; and
a tribological assembly including first and second mechanical components in relative motion with respect to each other, the assembly having a nickel phosphide surface and an additive lubricant including at least one component of the formulas (I) or (III):

$$M_xNO_y \qquad (I),$$

where
M is any transition metal,
x (M:N ratio) is any number between 0.5 and 10, and
y (O:N ratio) is any number between 1 and 4;

$$M_xCrO_y \qquad (III),$$

where
M is any transition metal,
x (M:Cr ratio) is any number between 0.1 and 2, and
y (O:Cr ratio) is any number between 1 and 6,
the device being a sealed vacuum device.

10. The device of claim 9, wherein the additive lubricant includes one compound of formula (I) and one compound of formula (III) in a ratio of 2:1.

11. The device of claim 9 further comprising at least one compound of formula (II):

$$M_xSiO_y \qquad (II),$$

where
M is Mg or Al,
x (M:Si ratio) is any number between 0.5 and 2, and
y (O:Si ratio) is any number between 2.5 and 6.

12. The device of claim 1 further comprising an external electrical circuit connected to the first and second mechanical components and configured to generate Joule heating to temporarily decrease the viscosity of the additive to embed friction-generated particulates within the additive.

13. The device of claim 9, wherein the additive includes $V_6N_2O_{16}$.

14. The device of claim 9, wherein the additive further includes a solid exfoliating material.

15. The device of claim 9, wherein the additive is electrically insulating.

16. A vacuum sealed assembly comprising:
a tribological surface area including first and second mechanical components in relative motion with each other and an additive lubricant in contact with the tribological surface area, the additive lubricant embedding particulate material generated by friction in the tribological surface area, the additive lubricant including at least one component of the formula (I):

$$M_xNO_y \qquad (I),$$

where
M is any transition metal, Ca, or Sb,
x (M:N ratio) is any number between 0.25 and 10, and
y (O:N ratio) is any number between 1 and 8.

17. The assembly of claim 16, wherein the assembly includes a silver alloy surface.

18. The assembly of claim 16, wherein the assembly includes a nickel phosphide surface.

19. The assembly of claim 16 further comprising at least one compound of formula (II):

$$M_xSiO_y \qquad (II),$$

where
M is Mg or Al,
x (M:Si ratio) is any number between 0.5 and 2, and
y (O:Si ratio) is any number between 2.5 and 6.

20. The assembly of claim 16 further comprising one or more exposed electronic contacts.

* * * * *